United States Patent [19]

Ohyama

[11] Patent Number: 4,645,316
[45] Date of Patent: Feb. 24, 1987

[54] REAR VIEW MIRROR ASSEMBLY
[75] Inventor: Yasuo Ohyama, Toyota, Japan
[73] Assignee: Toyota Jidosha Kabushiki Kaisha, Japan
[21] Appl. No.: 756,952
[22] Filed: Jul. 19, 1985
[30] Foreign Application Priority Data
  Jul. 23, 1984 [JP]  Japan ............................ 59-111269[U]
[51] Int. Cl.⁴ .......................... G02B 5/08; G02B 7/18; B60R 1/04
[52] U.S. Cl. .................................. 350/632; 248/549; 248/481; 296/84 B; 403/2
[58] Field of Search ...................... 350/632, 635, 639; 248/549, 481–484, 900, 467; 296/84 B; 403/2

[56] References Cited

U.S. PATENT DOCUMENTS

| 3,425,657 | 2/1969 | Doyle | 248/181 |
| 3,471,115 | 10/1969 | Corbin | 248/183 |
| 3,575,375 | 4/1971 | Strem, Jr. | 248/481 |
| 3,887,156 | 6/1975 | Hugonnier | 248/549 |
| 3,928,894 | 12/1975 | Bury et al. | 248/467 |
| 4,012,022 | 3/1977 | Tomita | 248/549 |
| 4,254,931 | 3/1981 | Aikens et al. | 248/549 |

FOREIGN PATENT DOCUMENTS

| 528543 | 10/1954 | Belgium | 248/481 |
| 2410388 | 9/1975 | Fed. Rep. of Germany | 296/84 B |
| 2233826 | 1/1975 | France | 296/84 B |
| 2264685 | 10/1975 | France | 296/84 B |
| 58-24595 | 5/1983 | Japan | 350/632 |
| 2048803 | 12/1980 | United Kingdom | 248/467 |

Primary Examiner—Jon W. Henry
Attorney, Agent, or Firm—Parkhurst & Oliff

[57] ABSTRACT

This invention relates to a rear view mirror assembly which facilitates installation of components of the rear view mirror assembly on a windshield of a vehicle. The rear view mirror assembly includes a first base member and a unit. The first unit includes a second base member, a spring, a mounting member, a second ball member, a bolt and a support arm on which a rear view mirror is rotatably mounted. The first base member has a plurality of flanges on which the second base member of the unit is mounted. The spring is mounted on the second base member. The mounting member includes a first socket portion and a first aperture. The support arm has a first ball portion which is slidably mounted on the first socket portion of the mounting member, and a second socket portion which is slidably mounted on the second ball member. The bolt has an end connected to the second ball member. The bolt is inserted into the first aperture of the mounting member and the second aperture of the support arm and an opposite end of the bolt connected to the spring. Therefore, the until is united by the bolt, and the unit of the rear view mirror assembly is installed easily on the first base member.

20 Claims, 13 Drawing Figures

REAR VIEW MIRROR ASSEMBLY

BACKGROUND OF THE INVENTION

The present invention relates to a rear view mirror assembly of a vehicle, and more particularly to improvements in a connecting device for installing the rear view mirror assembly on a body member of a vehicle.

The following U.S. Patent Applications are contemporaneous with this application and disclose rear view mirror assemblies:

U.S. patent application Ser. No. 756,953, filed July 19, 1985;

U.S. patent application Ser. No. 756,950, filed July 19, 1985; and

U.S. patent application Ser. No. 756,827, filed July 19, 1985. The disclosure of each of the above-identified applications is herein incorporated by reference.

An adjustable device disposed between a base member and a support arm of a rear view mirror is disclosed in Japanese Utility Model Laid-open No. Showa 58-24595. In this Japanese Utility Model Laid-open No. Showa 58-24595, the rear view mirror includes a support arm, a spring and a base member. The base member is cemented on an interior of a windshield, and includes a bar and a mounting portion. The spring includes a hooked end and a rear edge, and the hooked end being mounted on the bar of the base member. The rear edge of the spring is disposed on the mounting portion, and the support arm is fixed on the spring by a bolt.

Further, the base member includes a slanted surface on a bottom surface thereof and the support arm includes an incline on an end thereof. As shown in FIG. 12 of Japanese Utility Model Laid-open No. Showa 58-24595, when a force "Pc" is applied to the rear view mirror, the support arm is moved downwardly and breaks away, because the incline of the support arm and the slanted surface of the base member prevent the support arm from resisting the force "Pc".

Furthermore, this rear view mirror assembly includes a spherical ball portion disposed on an opposite end of the support arm, the ball portion being received within a socket portion of the rear view mirror.

Therefore, this rear view mirror can be adjusted to its angle through the spherical ball portion and the socket portion of the rear view mirror. However, the range of the adjustment of this rear view mirror is rather small, because this rear view mirror includes only one adjustment device. In addition, it is not easy for a worker to install the components of the rear view mirror because the worker must install the nut of the spring into the hole of the support arm and then fix the support arm on the spring with a bolt. Such installment procedures are cumbersome and complex.

Another adjustment device disposed between a windshield header and a support arm of a rear view mirror is disclosed in U.S. Pat. No. 3,575,375.

In this U.S. Pat. No. 3,575,375, the rear view mirror assembly includes a first adjustment device and a second adjustment device. The first adjustment device includes a clamping plate and a spherical ball on one end of the support arm. The second adjustment device includes a stud adjustably mounted on an opposite end of the support arm. The rear view mirror is mounted on the stud. Thus, this rear view mirror assembly can be adjusted to a wide range of angular positions by the first adjustment device and the second adjustment device.

Further, the ball on the support arm has a V-shaped notch so that the support arm can break away from the clamping plate when an excessive force is applied to the rear view mirror by rotating the support arm about the spherical ball. However, during assembly, it is necessary for a worker to pay attention to the desired distance between a mounting bracket for the entire assembly and the clamping plate, because the support arm cannot break away when a less than desired distance is defined between the mounting bracket and the clamping plate. It is further noted that the support arm cannot mount on the windshield header when a greater than desired distance is defined between a mounting bracket and the clamping plate. Thus, the device disclosed in the '375 patent is relatively difficult to assemble.

A rear view mirror having an adjustment device which is disposed between a body member of a vehicle and the rear view mirror is disclosed in U.S. Pat. No. 3,471,115. This adjustment device includes a semi-spherical socket portion and a spring. The semi-spherical socket portion engages frictionally with a ball end of a support arm for the rear view mirror, and a spring biases the ball end into engagement with the semi-spherical socket portion. The rear view mirror can move universally about the adjustment device when a force is applied thereto. However, the rear view mirror cannot break away from its mounting bracket under an excessive force because the support arm of the rear view mirror is connected to the mounting bracket through the spring.

U.S. Pat. No. 3,425,657 discloses a rear view mirror assembly having a ball and socket joint. The ball includes a plurality of projections mating within grooves in the socket. The rear view mirror assembly, however, cannot break away from the windshield.

SUMMARY OF THE INVENTION

The present invention has been developed in view of the foregoing background and to overcome the foregoing drawbacks. It is accordingly an object of this invention to provide a connecting device for a rear view mirror assembly which facilitates installation.

Another object of the present invention is to provide a rear view mirror assembly which is able to break away from a windshield, when more than a predetermined amount of a force is applied to the rear view mirror assembly in all directions of the rear view mirror.

It is another object of the invention to provide a rear view mirror assembly which is able to be adjusted universally to a wide range of angular positions.

Further, it is another object of the present invention to provide a first base member of a rear view mirror assembly which engages a second base member of a first unit of the rear view mirror assembly without an engagement device.

In order to accomplish the above-described objects, a rear view mirror assembly according to the present invention includes a first base member and a first unit of the rear view mirror assembly. The first unit of the rear view mirror assembly includes a second base member, a mounting member, a spring, a support arm, a second ball member, a bolt and a rear view mirror. The first base member is preferably cemented to a windshield of a vehicle, and is provided with a plurality of flanges which engage the second base member.

The second base member has a hook and a mounting portion. The mounting member is disposed on the mounting portion of the base member, and includes a first socket portion and a first aperture thereon. The first aperture is opened in the first socket portion. The spring is mounted on the hook of the base member, and the spring has an engagement device. The support arm includes an outer surface and an inner surface on an end thereof. The outer surface of the support arm is slidably mounted on the first socket portion of the mounting member, and the inner surface of the support arm includes a second socket portion. A second aperture is opened in both of the second socket portion of the inner surface and the outer surface. The rear view mirror is rotatably mounted on an opposite end of the support arm.

The second ball member is slidably mounted on the second socket portion of the support arm, and the second ball member is connected to an end of the bolt. The bolt is inserted into the second aperture of the support arm and the first aperture of the mounting member, and the other end of the bolt is engaged with the engagement device of the spring.

Therefore, the components of the first unit of the rear view mirror assembly are united to facilitate installation of the first unit on the first base member. The present invention thus obviates the piece-by-piece installation procedures common to the prior art.

The second unit of the rear view mirror assembly includes the spring, the mounting member, the support arm, the second ball member, the bolt and the rear view mirror. The spring of the first unit of the rear view mirror assembly can support a predetermined amount of the downward vertical force on the hook of the base member, so that the second unit of the rear view mirror assembly can break away from the second base member, when more than the predetermined amount of the downward vertical force is applied thereto.

Further, the engagement device of the spring has an inner end therein, so that the inner end prevents the bolt from being inserted more than a predetermined length. Therefore, a length defined between the engagement device and the second ball member is constant. Accordingly, it is not necessary of a worker to pay any attention to the length during assembly.

A diameter of the second aperture of the support arm is longer than a diameter of both the first aperture of the mounting member, so that the support arm can rotate about the bolt, and the support arm is capable of being universally adjusted to any angle in a wide range of angles.

BRIEF DESCRIPTION OF THE DRAWINGS

The above objects, features and advantages of the present invention will become more apparent from the description of the invention which follows, taken in conjunction with the accompanying drawings, wherein like reference numerals denote like elements, and wherein.

DETAILED DESCRIPTION OF THE PREFERRED EMBODIMENTS

The present invention will be described in detail with reference to the accompanying drawings which illustrate different embodiments according to the present invention.

Figure 1:
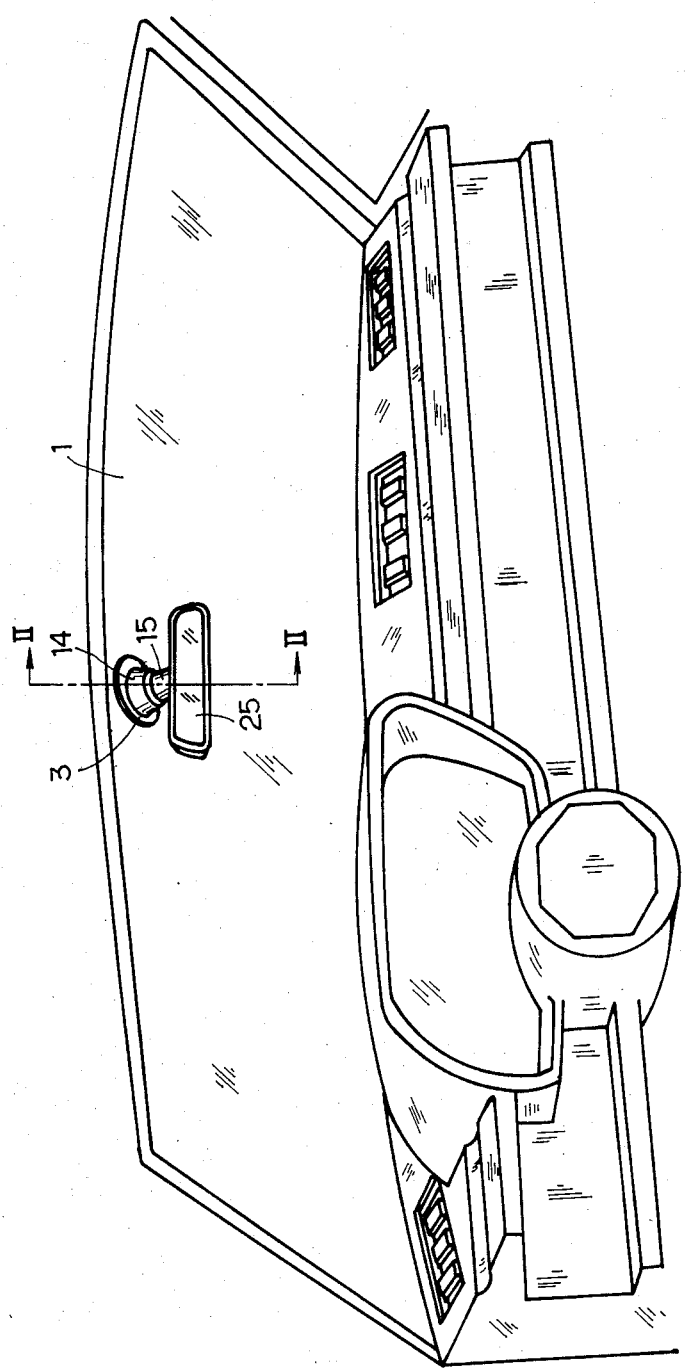
FIG. 1 is a perspective view showing a rear view mirror assembly according to the present invention.

Referring to FIG. 1, a rear view mirror assembly is disposed at an upper central portion of a windshield 1 of a vehicle. A rear view mirror 25 is rotatably mounted on an inner surface of the windshield 1 through a support arm 15, a mounting member 14 and a first base member 3.

Figure 2:
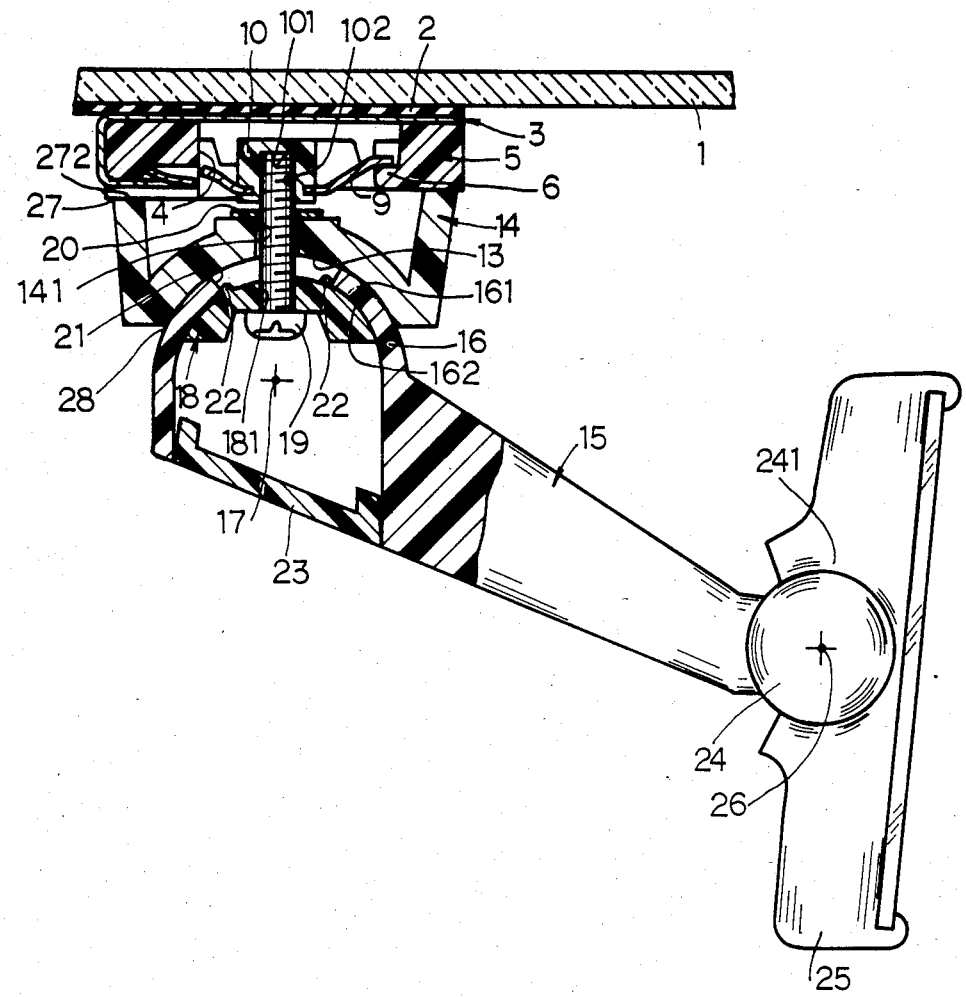
FIG. 2 is an enlarged cross-sectional view of the rear view mirror assembly of a first embodiment, taken along the line II—II in FIG. 1.
Figure 3:
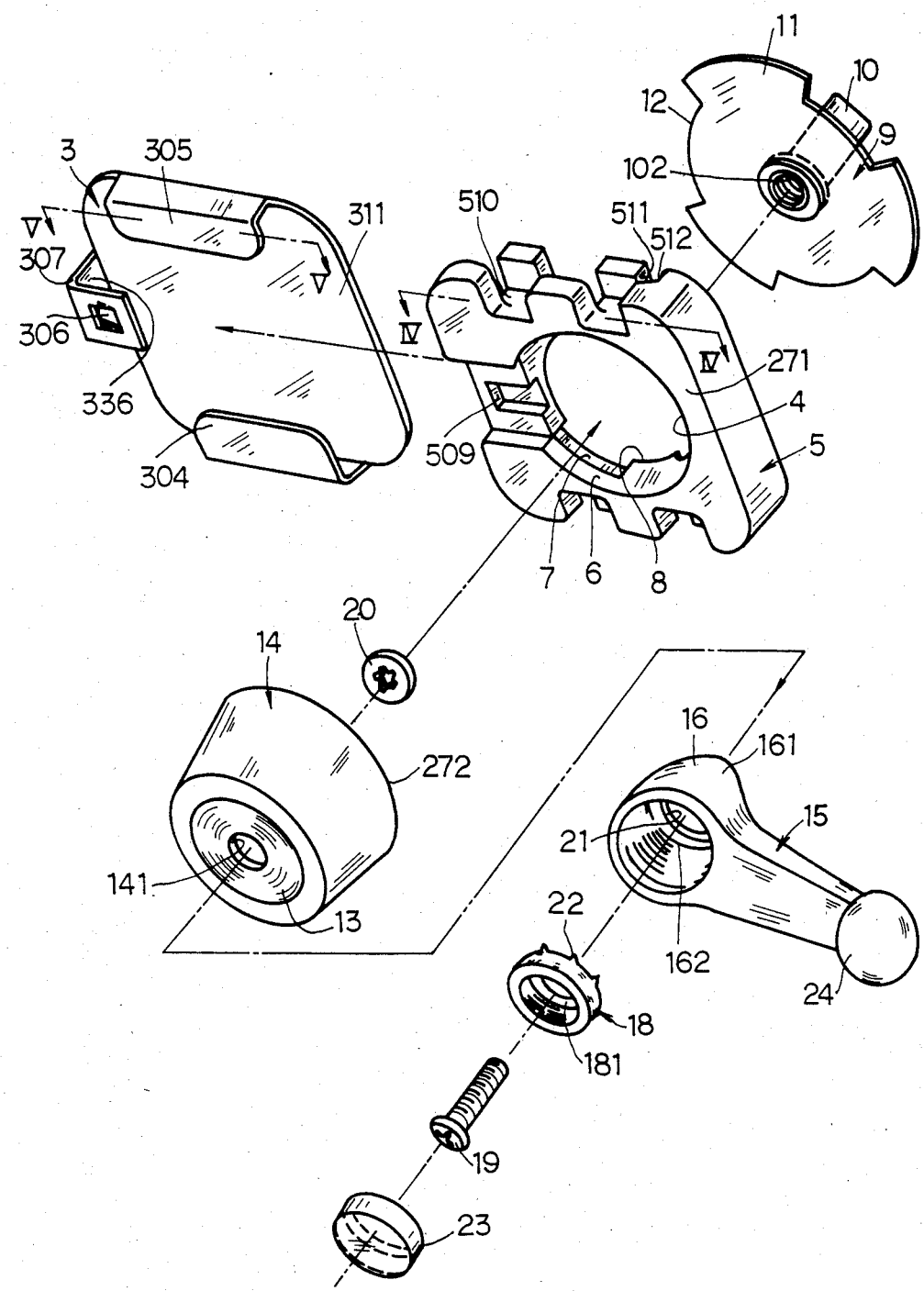
FIG. 3 is an enlarged perspective view showing components of the rear view mirror assembly shown in FIG. 1 in a disassembled condition.

As shown in FIG. 2 and FIG. 3, the first base member 3 is cemented by an adhesive 2 to the windshield 1. The first base member 3 includes a plurality of first flanges 304, 305 and a second flange 307. Each of the plurality of first flanges 304, 305 is disposed on a side portion of the first base member 3.

Figure 5:
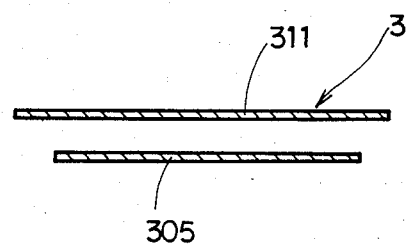
FIG. 5 is a cross-sectional view of the first base member of the rear view mirror assembly of FIG. 3, taken along the line V—V of FIG. 3.

As shown in FIG. 5, the first flange 305 has a plate which extends horizontally, and parallels a main plate 311 of the first base member 3. As shown in FIG. 3, the first flange 305 extends downwardly from the side portion of the main plate 311 of the first base member 3, and is bent toward an inside of the first base member 3.

The second flange 307 is disposed on a front portion of the first base member 3, and includes a second stopper 336 and a pawl 306. The second stopper 336 is on a vertical portion of the second flange 307 which extends downwardly from the main plate 311 of the first base member 3. The pawl 306 is disposed on a horizontal portion of the second flange 307 which extends from a lower part of the vertical portion of the second flange 307. The pawl 306 is biased upwardly toward the main plate 311.

A first unit for installing the rear view mirror assembly on the windshield 1 includes a second base member 5, a spring 9, the mounting member 14, the support arm 15, a second ball member 18 and a bolt 19.

Figure 4:
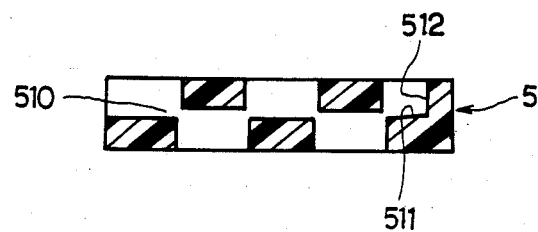
FIG. 4 is a cross-sectional view of the second base member of the rear view mirror assembly of FIG. 3 taken along the line IV—IV of the FIG. 3.
Figure 6:
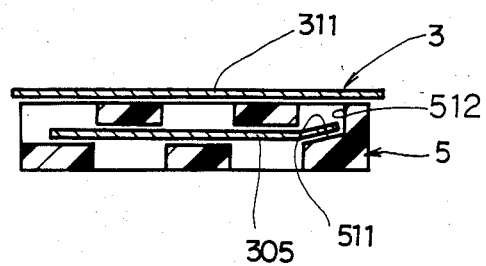
FIG. 6 is a cross-sectional view of the second base member mounted to the first base member of the rear view mirror assembly, taken along the line V—V of FIG. 3.

The second base member 5 is mounted on the plurality of first flanges 304, 305 and the second flange 307 of the first base member 3. The second base member 5 includes a plurality of upper projections and a plurality of lower projections which are disposed on both sides of the second base member 5. Each projection of the lower projections and the upper projections has an inner surface. As shown in FIG. 4 and FIG. 6, a gash 510 is defined between the inner surfaces of the lower projections and the inner surfaces of the upper projections on each side of the second base member 5. The plates of the first flanges 304, 305 of the first base member 3 are inserted into the gash 510 on each side of the second base member 5. A rearmost projection (i.e., furthest from the pawl 306) on each side of the second base member 5 includes a third stopper 512 and an inclined inner surface 511, so that a rear portion of the plate of the first flange 305 of the first base member 3 is bent along the inclined inner surface 511 of the rearmost projections of the second base member 5. Accordingly, the plates of the first flanges 304, 305 of the first base member 3 securely engage with the inner surfaces of the projections of the second base member 5.

The second stopper 336 of the second flange 307 of the first base member 3 and the third stopper 512 of the rearmost projection of the second base member 5 prevent the second base member from being inserted more than a predetermined distance on a plurality of the first flanges 304, 305 and the second flange 307 of the first base member 3.

The second base member 5 includes an engagement recess 509 which is defined on a bottom surface thereof, and the pawl 306 of the second flange 307 of the first base member 3 engages with the engagement recess 509 of the second base member 5. Therefore, the pawl 306 of the first member 3 prevents the second base member 5 from moving between the plurality of the first flanges 304, 305 and the second flange 307 of the first base member 3.

The second base member 5 includes a mounting portion 271 which is disposed in the vicinity of an outer peripheral edge thereof, and is on a substantially flat horizontal surface. A hook 6 extends from an inner portion of the mounting portion 271. The hook 6 has an inner peripheral edge and an upper surface, the inner peripheral edge defining an opening 4 within the second base member 5. The upper surface of the hook 6 has a plurality of second projections 8 and a plurality of second recesses 7 thereon.

A spring 9 is disposed within the opening 4 of the second base member 5. The spring 9 includes a cap 10, a plurality of first projections 11 and a plurality of first recesses 12. The cap 10 is fixed at a central portion of the spring 9, and includes a cavity 102 with an inner end 101 therein. The cavity 102 of the cap 10 includes a screw hole therein.

The plurality of first projections 11 of the spring 9 extend outwardly in its radial direction, and engage with the plurality of second recesses 7 of the second base member 5. Therefore, the spring 9 engages securely with the second base member 5, so that the spring 9 cannot rotate in the opening 4 of the second base member 5. Further, the spring 9 can support a predetermined amount of a downward vertical force so that the spring 9 can break away from the hook 6, when more than the predetermined amount of the downward vertical force is applied to the spring 9.

The mounting member 14 is disposed on the mounting portion 271 of the second base member 5. The mounting member 14 includes an upper peripheral edge 272 and a first socket portion 13. The upper peripheral edge 272 is in contact with the mounting portion 271 of the second base member 5, and the first socket portion 13 of the mounting member 14 is formed in a lower surface of the mounting member 14. The first socket portion 13 is formed in a semi-spherical concave shape, and has a first aperture 141 at the central portion of the mounting member 14.

The support arm 15 is pivotally mounted on the first socket portion 13 of the mounting member 14. The support arm 15 has an opposite end 24. The end 16 of the support arm 15 includes an outer surface and an inner surface. The outer surface of the support arm 15 has a first ball portion 161 thereon formed in a semi-spherical convex shape. The first ball portion 161 is mounted on the first socket portion 13 of the mounting member 14. The inner surface of the support arm 15 includes a second socket portion 162 which is formed in a semi-spherical concave shape. The inner surface of the support arm 15 defines a recess within the end 16 of the support arm 15, and a second aperture 21 is opened between the second socket portion 162 of the inner surface of the support arm 15 and the first ball portion 161 on the outer surface of the support arm 15. The second aperture 21 has an inner peripheral edge. A diameter of the second aperture 21 is greater than the diameter of the first aperture 141 of the mounting member 4.

A curved or second ball member 18 having an upper semi-spherical convex surface is slidably mounted on the second socket portion 162 of the supporting arm 15. The second ball member 18 has a third aperture 181 and a plurality of protrusions 22 on its convex surface. Preferably, at least three protrusions 22 are disposed on the upper semi-spherical convex surface. The protrusions 22 are normally located within the inner peripheral edge of the second aperture 21.

A bolt 19 is provided for securing the various components together. The bolt 19 includes a head portion on an end thereof adjacent the second ball member 18. The opposite end of the bolt 19 is inserted into the cavity 102 in the cap 10 of the spring 9. An intermediate shank portion of the bolt 19 extends through the third aperture 181 of the second ball member 18, the second aperture 21 of the support arm 15, and the first aperture 141 of the mounting member 14. A diameter of the second aperture 21 is greater than the diameter of the first aperture 141 and the third aperture 181, so that the support arm 15 is supported for universal movement. That is, the support member 15 can rotate about the vertical axis of the bolt 19 (FIG. 2), the protrusions 22 rotating within the second aperture 21. The support member 15 can also rotate about a central point 17 (FIG. 2) of the support arm 15 to an extent defined by the inner peripheral edge of the second aperture 21. Rotation about the central point 17 requires the inner surface of the support arm 15 to ride over the protrusions 22.

It should be apparent to one skilled in the art that the bolt 19 may be a screw or a rod.

The opposite end of the bolt 19 is prevented from being inserted into the cavity 102 of the cap 10 more than a predetermined length by the inner end 101 of the cap 10, so that a bolt length defined between the cap 10 and the head portion of the bolt 19 is constant. The bolt length between the cap 10 and the head portion of the bolt 19 is greater than a sum of the thicknesses of the mounting member 14 around the first aperture 141, the supporting arm 15 around the second aperture 21, and the second ball member 18 around the third aperture 181. Therefore, the support arm 15 can move along the longitudinal axis of the bolt 19, as well as rotating about a central portion 17 of the support arm 15.

It will be apparent to one skilled in the art that the bolt 19 may be integral with the second ball member 18.

The recess of the support arm 15 opens downward in a lower portion of the support arm 15, and a cover 23 is disposed within the recess. Therefore, the cover 23 covers the recess and improves the aesthetic appearance of the rear view mirror assembly.

The opposite end of the support arm 15 includes a ball portion 24, and the ball portion 24 formed in a spherical ball shape. The ball portion 24 is rotatably received in a spherical socket portion 241 which is defined within the rear view mirror 25.

When the bolt 19 engages the spring 9, a second unit of the rear view mirror assembly is formed and includes the bolt 19, the spring 9, the mounting member 14, the support arm 15 and the second ball member 18. When the second unit is attached to the second base member 5 by engaging the spring 9 on the hook 6, a first unit of the rear view mirror assembly is formed. The first unit can be attached to the first base member 3 as described above. When more than the predetermined amount of the downward vertical force is applied to the spring 9, the second unit of the rear view mirror assembly can break away from the second base member 5.

A washer 20 is disposed between the cap 10 and the mounting member 14. Preferably, the washer 20 is made of synthetic resin. The washer 20 includes a hole therein which is slightly smaller than a diameter of the bolt 19. Therefore, the washer 20 prevents the bolt 19 from moving easily in the hole of the washer 20, once the bolt 19 is inserted into the hole of the washer 20. Further, the washer 20 and the bolt 19 can unite the mounting member 14, the support arm 15 and the second ball member 18, such that these components cannot change their relative position during assembly of the rear view mirror. During assembly, these components (i.e., mounting member 14, support arm 15 and second ball member 18, all of which are united by the bolt 19 and the washer 20) are attached to the spring 9 by threading the bolt 19 into the cop 10 to form the second unit. The assembly of the second unit with the second base member 5 forms the first unit.

As shown in FIG. 2, the plurality of protrusions 22 of the second ball member 18 are normally disposed in the second aperture 21 of the support arm 15, so that the plurality of protrusions 22 normally prevent the rotation of the support arm 15 about the central point 17. Therefore, it is convenient for a worker assemble the components into the second unit and to install the second unit of the rear view mirror assembly on the second base member 5, because these components cannot change their positions due to the interlocked relation between the protrusions 22 and the second aperture 21 of the support arm 15. That is, the insertion of the protrusions 22 within the second aperture 21 temporarily maintains the components in position during assembly. As noted above, once assembled, the inner surface of the support arm 15 can ride over the protrusions 22 to permit rotation about the central point 17.

The second unit is attached to the second base member 5 to form the first unit. The first unit is easily installed on a vehicle by sliding the second base member 5 between the flanges 304, 305 of the first base member 3. The second base member 5 is locked in the correct position on the first base member 3 by the second and third stoppers 336, 512, as well as engagement of the pawl 306 in the recess 509.

Consequently, assembly and installation of the rear view mirror in accordance with the present invention are simplified. Assembly and installation are thus less cumbersome and time consuming than known rear view mirror assemblies.

Description will be hereunder given of operation of the above-described embodiment.

Figure 7:
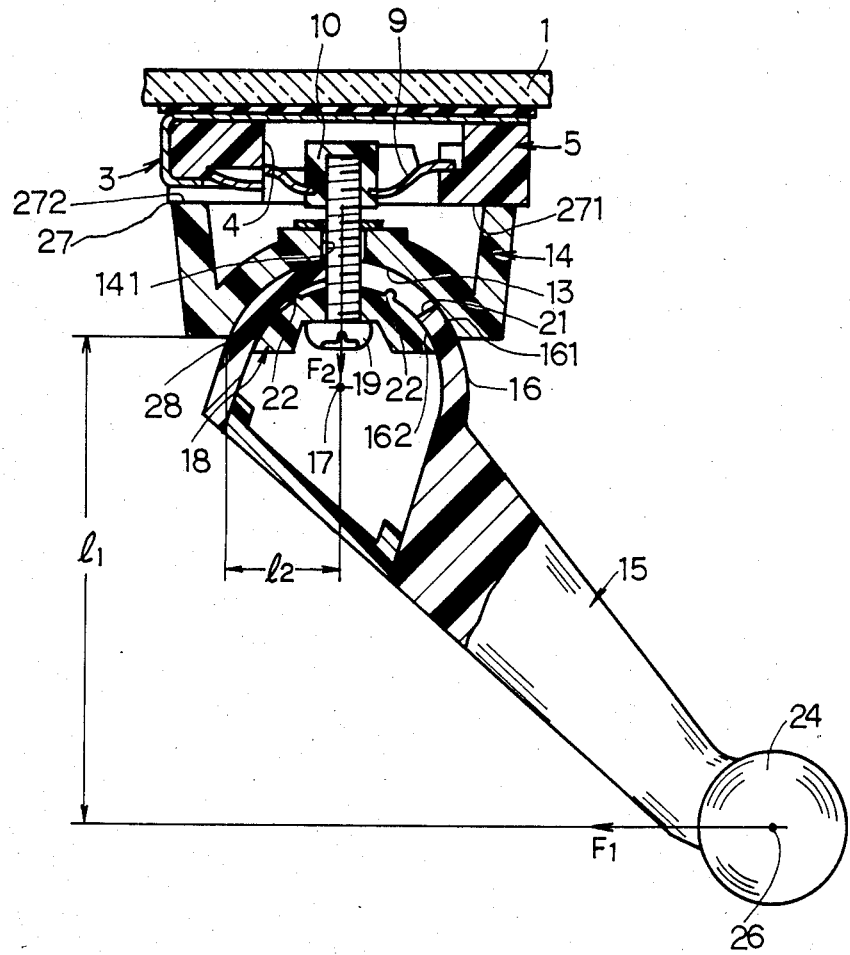
FIG. 7 is a cross-sectional view of the rear view mirror assembly of FIG. 2, which shows the support arm rotated about a central rotational point 17 of the support arm in the clockwise direction of FIG. 2 when a force "$F_1$", is applied to the support arm in the horizontal direction of FIG. 2.

As shown in FIG. 7, the inner surface of the support arm 15 can ride on the protrusion 22 of the second ball member 18, when a force "$F_1$" is applied to a central point 26 of the ball end 24 of the support arm 15. As a result of the force "$F_1$", the support arm 15 rotates about a central point 17 of the support arm 15. The intermediate shank portion of the bolt 19 limits the movement of the support arm 15 to rotate within a space defined by the second aperture 21. That is, the inner peripheral edge of the second aperture 21 contacts the intermediate shank portion of the bolt 19 and thus limits the rotation of the support arm 15 about the central point 17.

When the force "$F_1$" is continuously applied to the support arm 15 in the horizontal direction in FIG. 7, a first moment $M_1$ in the clockwise direction about a point 28 is calculated by a first formula (1) as follows:

$$M_1 = l_1 \cdot F_1 \tag{1}$$

In this first formula (1), $l_1$ is a vertical length between the point 28 and the central point 26 of the ball end 24 for the rear view mirror 25. The point 28 is defined between the first ball portion 161 of the support arm 15 and an edge of the first socket portion 13 of the mounting member 14.

A second moment "$M_2$" in the clockwise direction about point 28 in FIG. 7 is calculated by the second formula (2) as follows:

$$M_2 = l_2 \cdot F_2 \tag{2}$$

In the second formula (2), $l_2$ is the horizontal length between point 28 and the bolt 19, and "$F_2$" is a downward vertical force on the bolt 19. The resiliency of the spring 9 resists the force "$F_2$".

For equilibrium, $M_1$ must equal $M_2$. Therefore, the downward vertical force "$F_2$" along the bolt 19, which is applied to the spring 9, is calculated by a third formula (3) as follows:

$$F_2 = (l_1/l_2) \cdot F_1 \tag{3}$$

Figure 8:
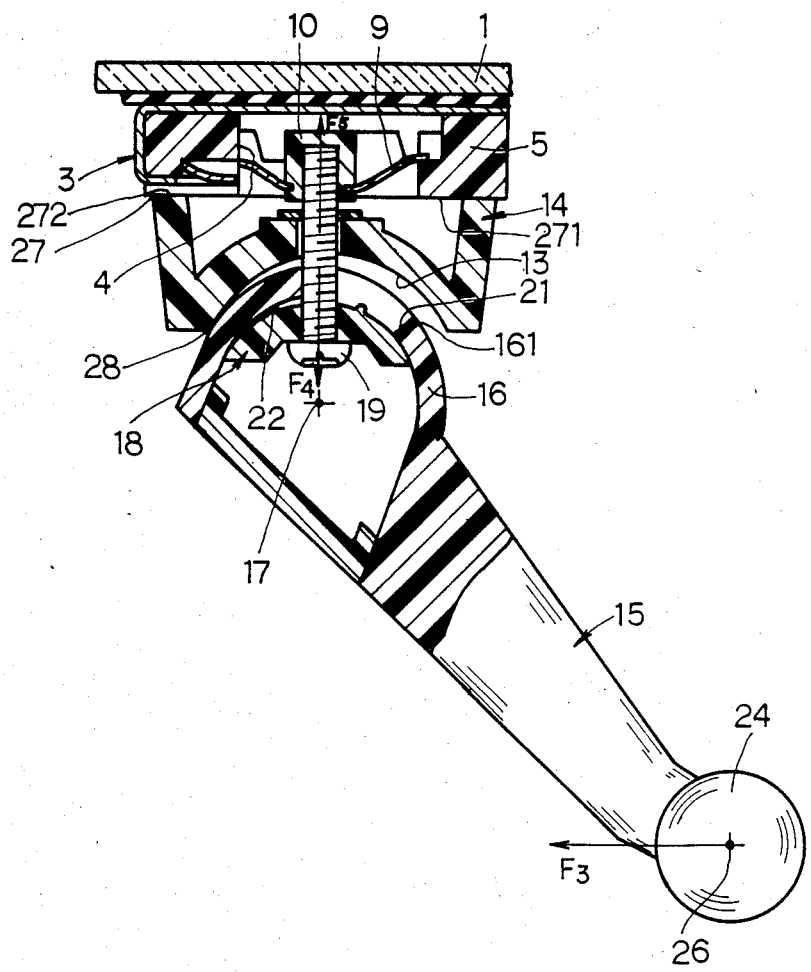
FIG. 8 is a cross-sectional view of the rear view mirror assembly of FIG. 2 which shows the support arm rotated about the central point 17 in the clockwise direction in an amount greater than the condition illustrated in FIG. 7.

In FIG. 8, a force "F₃" is applied to the central point 26 and a downward vertical force "F₄" is applied to the spring 9. If the force "F₃" is larger than the force "F₁", and a force "F₄" is not larger than the predetermined downward vertical force, the support arm 15 is further rotated about the point 28. The first ball portion 161 of the support arm 15 separates partially from the first socket portion 13 of the mounting member 14, and the support arm 15 is supported by the spring 9. In this condition, the force "F₄" is balanced with a bias force "F₅" of the spring 9 so that the moments generated about the point 28 are equal. The force "F₄" is calculated by a fourth formula (4) as follows:

$$F_4 = (l_1/l_2) \cdot F_3 \quad (4)$$

Next, if the force "F₃" becomes larger, and the force "F₄" becomes larger than the predetermined amount of the downward vertical force, the spring 9 can break away from the hook 6 of the second base member 5. Concurrently the first unit of the rear view mirror assembly can break away when the spring 9 separates from the hook 6.

Figure 9:
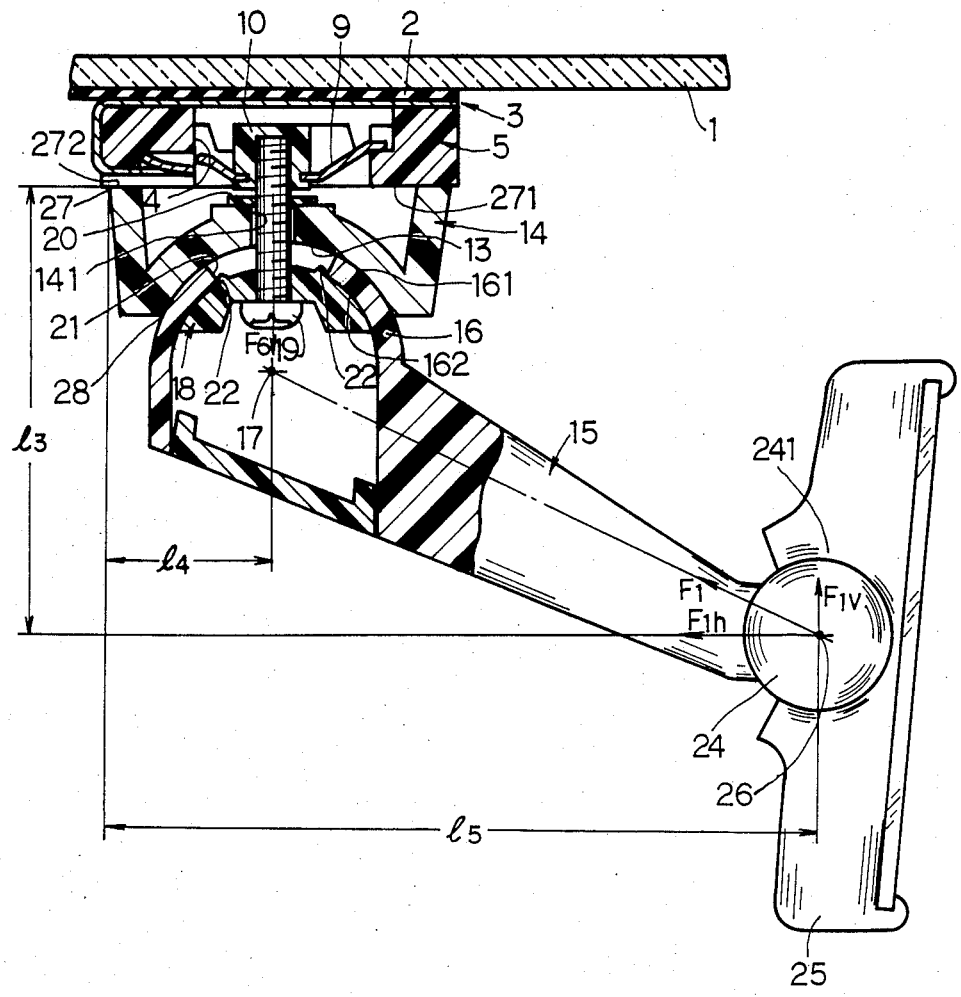
FIG. 9 is a cross-sectional view of the rear view mirror assembly of FIG. 2, which shows the force "$F_1$" applied to the support arm along the line connecting the central point 17 of the support arm to a central point for of the rotation of the rear view mirror.

As shown in FIG. 9, when the force "F₁" is applied to the support arm 15 along the line which connects the central point 26 to the central point 17 of the support arm 15, the support arm 15 cannot be rotated about the central point 17.

However, the vertical and horizontal components $F_{1v}$, $F_{1h}$ of the force $F_1$ cause a third moment $M_3$ in the clockwise direction about a point 27, the point 27 being defined between the mounting portion 271 of the second base member 5 and the upper edge 272 of the mounting member 14. The third moment $M_3$ in the clockwise direction about the point 27 is calculated by a fifth formula (5) as follows:

$$M_3 = l_3 \cdot F_{1h} - l_5 \cdot F_{1v} \quad (5)$$

In this fifth formula (5), $l_3$ is a vertical length between the point 27 and the central point 26 of the rotation of the rear view mirror 25, and $l_5$ is a horizontal length between the point 27 and the point 26.

Figure 10:
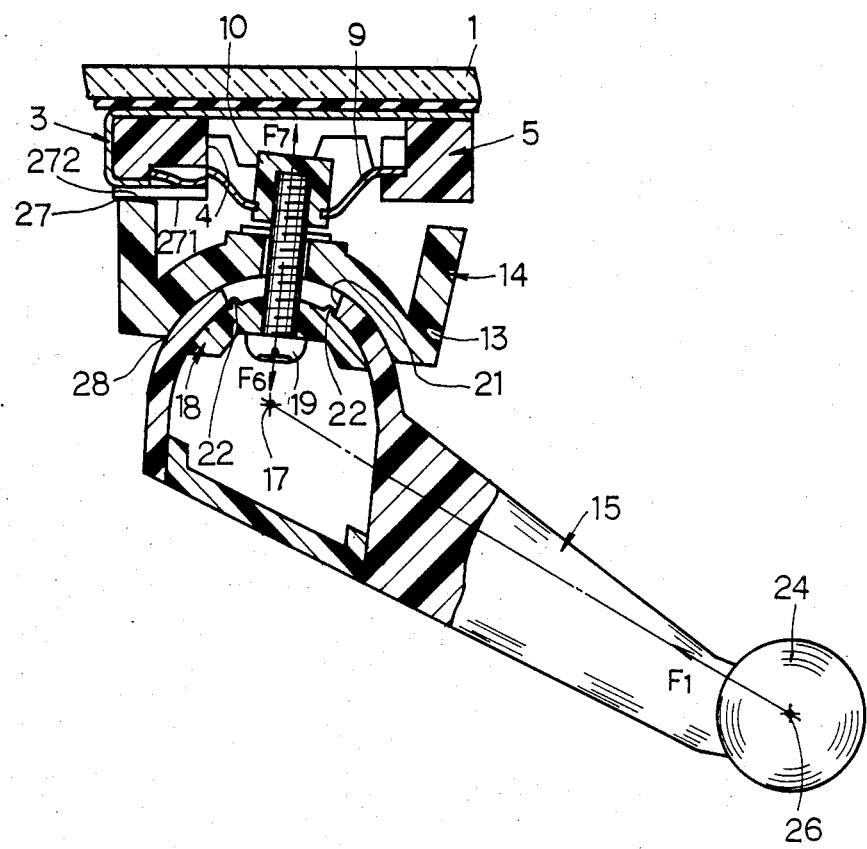
FIG. 10 is a cross-sectional view of the rear view mirror assembly of FIG. 2, which shows the support arm rotated about a contact point 27 between a mounting member and a base member in the clockwise direction.

Therefore, as shown in FIG. 10, the support arm 15 and the mounting member 14 can be rotated about the point 27, so that the upper edge 272 of the mounting member 14 separates partially from the mounting portion 271 of the second base member 5. In this case, both of the support arm 15 and the mounting member 14 are supported by the spring 9. In FIG. 10, a downward vertical force "F₆" along the bolt 19 generates a fourth moment M₄ in the clockwise direction about the point 27. The fourth moment M₄ is calculated by the following sixth formula (6):

$$M_4 = F_6 \cdot l_4 \quad (6)$$

In this sixth formula (6), $l_4$ is a horizontal length between the point 27 and the bolt 19.

If M₃ equals M₄, then the force F₆ along the bolt 19 is balanced with a bias force "F₇" of the spring 9 and calculated by a seventh formula (7) as follows:

$$F_6 = (l_3 \cdot F_{1h} - l_5 \cdot F_{1v})/l_4 = F_7 \quad (7)$$

Next, if the force "F₁" increases and the force "F₆" becomes larger than the predetermined amount of the downward vertical force, the spring 9 can break away from the hook 6 of the second base member 5. Therefore, the first unit of the rear view mirror assembly can break away.

Figure 11:
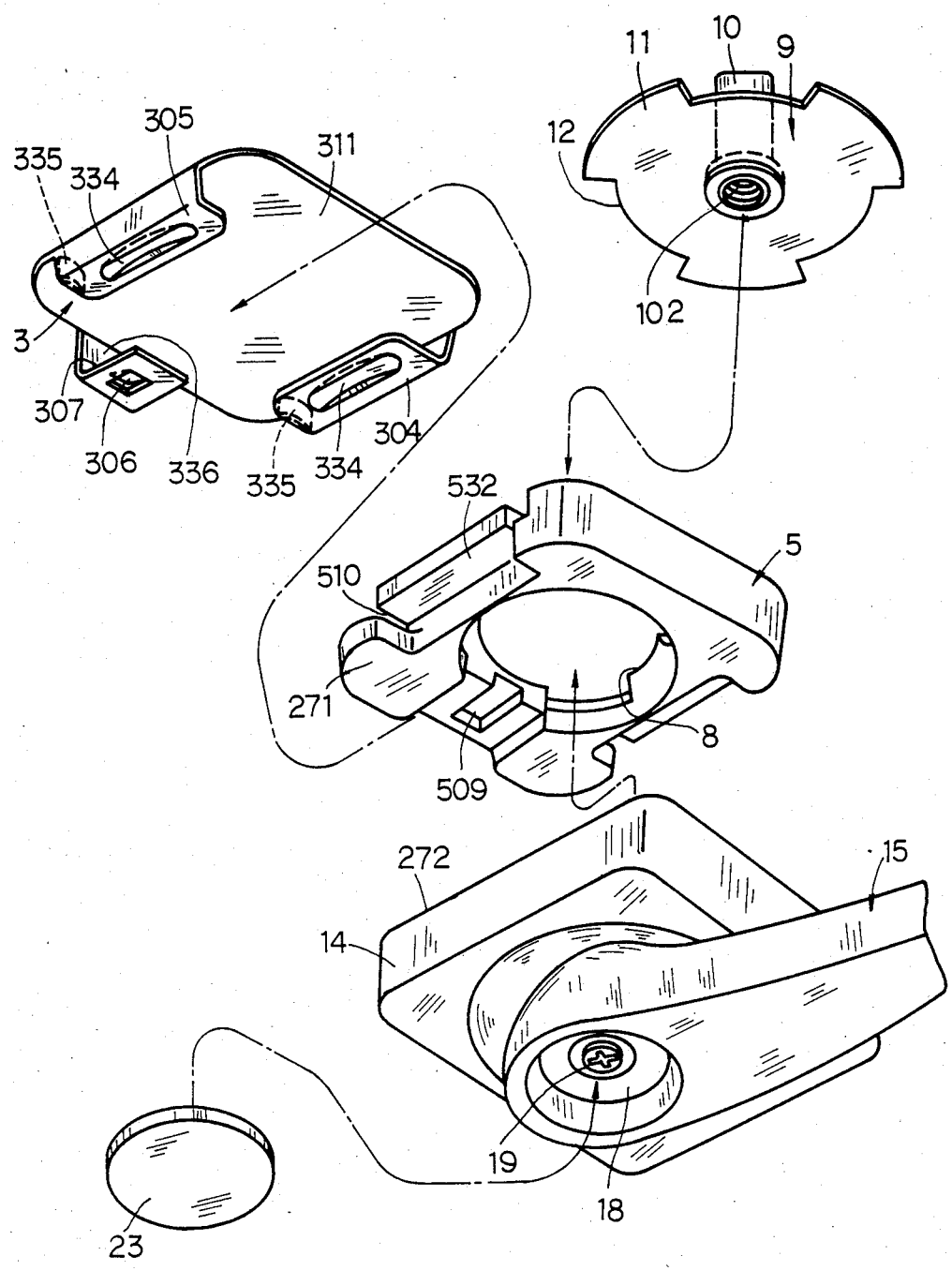
FIG. 11 is an enlarged perspective view of the rear view mirror assembly of a second embodiment, illustrating the components in a disassembled condition.

A second embodiment of a rear view mirror assembly is shown in FIG. 11. The second embodiment is similar to the first embodiment disclosed in FIG. 2. However, the second embodiment has several differences disclosed hereunder.

The first base member 3 has a pair of first flanges 304, 305, each having a plate. Each plate of the first base member 3 has a protrusion 334 which projects upwardly toward the main plate 311. In addition, the protrusion 334 of the first base member 3 is biased upwardly. Once assembled, the protrusion 334 of the first base member 3 is in contact with an inner surface 532 of an upper projection of a second base member 5, so that the protrusion 334 of the first base member 3 biases the second base member 5 on a main plate 311 of the first base member 3.

Each of the pair of the first flanges 304, 305 includes a first stopper 335 which is disposed on a front end of each of a pair of the first flanges 304, 305 adjacent the second flange 307. The first stopper 335 of each of the first flanges 304, 305 is a spring, which prevents the second base member 5 from being inserted more than a predetermined distance on the first flanges 304, 305 and the second flange 307 of the first base member 3.

The protrusion 334 and the first stopper 335 of the first flange 305 of the first member 3 prevent the second base member 5 from vibrating in a space which is defined between the plates of the first flanges 304, 305 and the main plate 311 of the first base member 3 in the vertical and longitudinal directions of the vehicle. Like the first embodiment, the second embodiment facilitates installation of the rear view mirror assembly.

Figure 12:
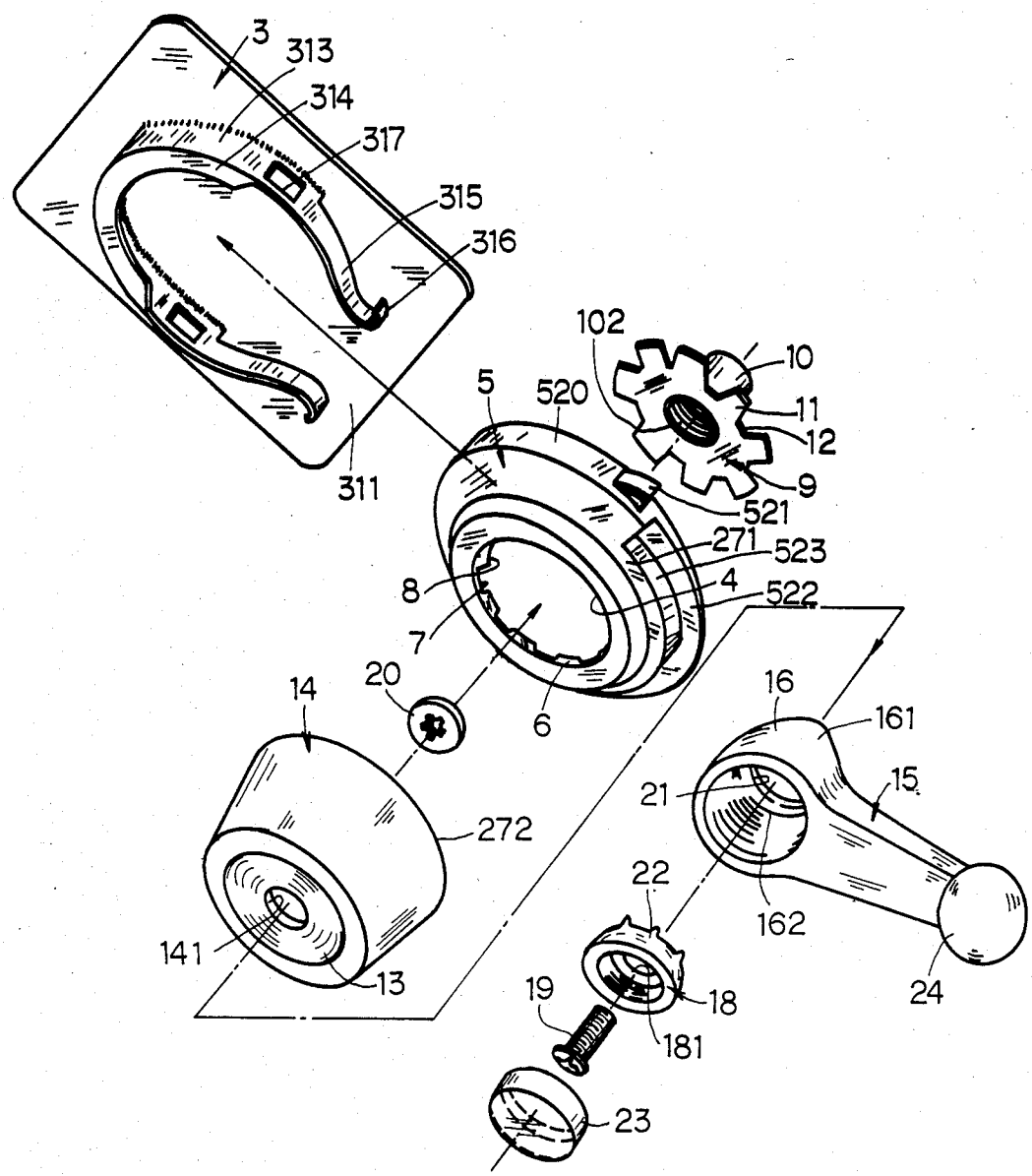
FIG. 12 is an enlarged perspective view of the rear view mirror assembly of a third embodiment, illustrating the components in a disassembled condition.

A third embodiment of rear view mirror assembly is shown in FIG. 12. The third embodiment is similar to the first embodiment disclosed in FIG. 3. However, the third embodiment has several differences disclosed hereunder.

A first base member 3 includes a wall 313, a first flange 314, a pair of holes 317 and a pair of clamping tabs 315. The wall 313 extends downwardly from a main plate 311 of the first base member 3 and is formed in a letter 'U' shape. The first flange 314 of the first base member 3 extends horizontally from a lower edge of the wall 313, and parallels the main plate 311 of the first base member 3. Each of a pair of holes 317 of the first base member 3 is opened in each of side portion of the wall 313, and each of the clamping tabs 315 extends horizontally from each of a pair of rear ends of the wall 313. The clamping tab 315 of the first base member 3 are spring biased toward an inside of the first base member 3. A space is defined between the main plate 311 and an upper edge of the clamping tab 315, and a rear end of the clamping tab 315 is bent back outwardly.

A second base member 5 includes an outer peripheral wall 520, a pair of pawls 521, and a step thereon. A front portion of the outer peripheral wall 520 of the second base member 5 is in contact with the wall 313 of the first base member 3, and a mounting portion 271 of the second base member 5 is mounted on the first flange 314 of the first base member 3. Each of the pair of pawls 521 of the second base member 5 engages with each of the pair of holes 317 of the first base member 3. The step of the second base member 5 is defined within a rear portion of the second base member 5, and the step of the second base member 5 includes a first horizontal plate 522 and a vertical surface 523. The first horizontal plate 522 of the second base member 5 is inserted into the space defined between the main plate 311 and the clamping tabs 315, and the vertical surface 523 of the second base member 5 is in contact with the clamping tabs 315 of the first base member 3. The third embodiment also facilitates installation of the rear view mirror assembly.

Figure 13:
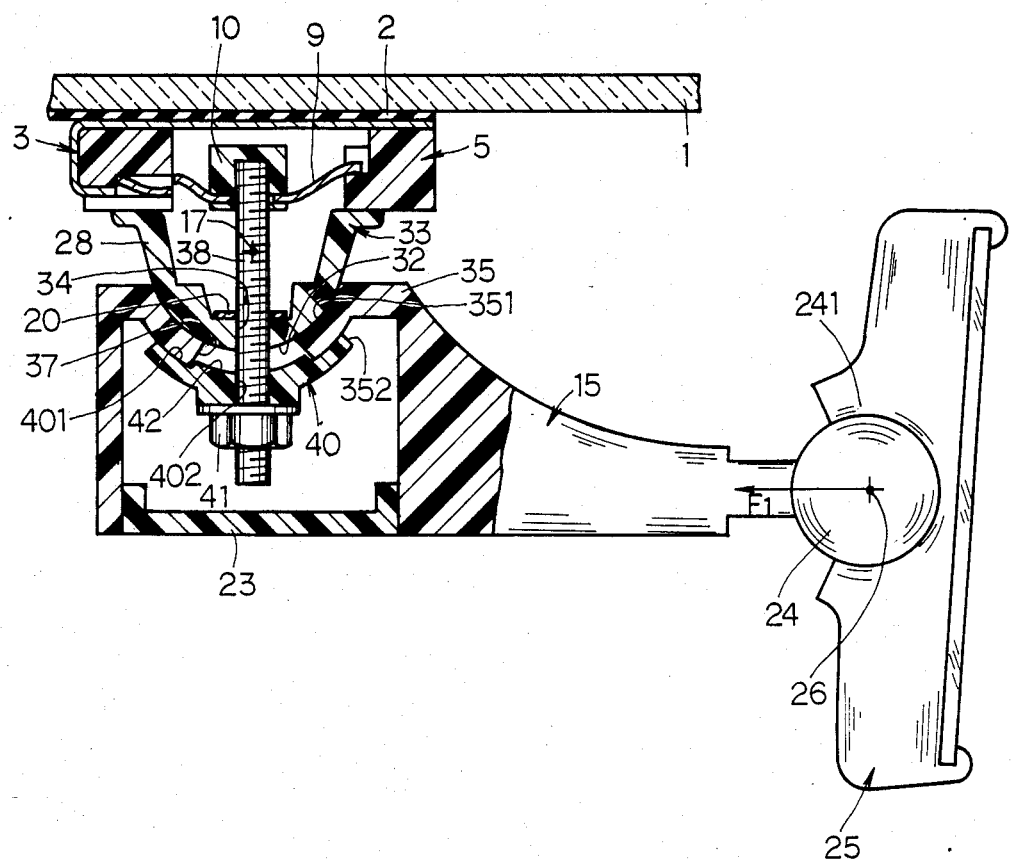
FIG. 13 is an enlarged cross-sectional view of the rear view mirror assembly of a fourth embodiment, taken along the line II—II in FIG. 1.

A fourth embodiment of a rear view mirror assembly is shown in FIG. 13. The fourth embodiment is similar to the first embodiment disclosed in FIG. 2. However, the fourth embodiment has several differences disclosed hereunder.

A bolt 38 engages with a cap 10 and extends downwardly from the spring 9. A mounting member 33 includes a third ball portion 32 at a lower surface thereof, and a fourth aperture 34 therein. The fourth aperture 34 is opened in the third ball portion 32, and the bolt 38 is inserted into the fourth aperture 34. A diameter of the fourth aperture 34 is slightly longer than a diameter of the bolt 38. The third ball portion 32 of the mounting member 33 is formed in a semi-spherical convex shape.

A support arm 15 includes an end 35 and an opposite end. The end 35 of the support arm 15 includes an outer surface and an inner surface thereof. A third socket portion 351 is formed on the outer surface of the support arm 15, and the third socket portion 351 is slidably mounted on the third ball portion 32 of the mounting member 33. The third socket portion 351 of the support arm 15 is formed in a semi-spherical socket concave shape, and a fifth aperture 37 is opened in the third socket portion 351 of the support arm 15. A diameter of the fifth aperture 37 of the support arm 15 is longer than the diameter of the fourth aperture 34 of the mounting member 33, and the bolt 38 is inserted into the fifth aperture 37 of the support arm 15. A fourth ball portion 352 is formed on the inner surface of the support arm 15, and the fourth ball portion 352 of the support arm 15 is formed in a semi-spherical convex shape. The fifth aperture 37 is opened in the fourth ball portion 352 of the support arm 15.

A fourth socket member 40 is mounted on the fourth ball portion 352 of the support arm 15, and the fourth socket member 40 includes an upper semi-spherical concave surface 401 and an inner peripheral edge thereof. The inner peripheral edge defines a sixth aperture 402 which is opened in the upper semi-spherical concave surface 401 thereof. A diameter of the sixth aperture 402 of the fourth socket member 40 is slightly longer than the diameter of the bolt 38, and the bolt 38 is inserted into the sixth aperture 402 of the fourth socket member 40.

The fourth socket member 40 includes a second protrusion 42 on the upper semi-spherical concave surface 401 thereof, and the second protrusion 42 is disposed around the sixth aperture 402 of the fourth socket member 40. The second protrusion 42 is formed in a trapezoid shape. The second protrusion 42 of the fourth socket member 40 is normally disposed into the fifth aperture 37 of the support arm 15, and the second protrusion 42 includes an inclined side and a semi-spherical concave surface thereof. An outer peripheral edge of the second protrusion 42 is rounded off. The inclined side of the second protrusion 42 is in contact with the inner peripheral edge of the support arm 15.

Therefore, the second protrusion 42 of the fourth socket member 40 temporarily prevents the support arm 15 from rotating about a central point 17 of the support arm 15. However, the fourth ball portion 352 of the support arm 15 can ride on the second protrusion 42 of the fourth socket member 40 by way of the inclined side and the round outer peripheral edge of the second protrusion 42, when a force "$F_1$" is applied on the support arm 15. A nut 41 is disposed under the fourth socket member 40 and the nut 41 engages with the bolt 38. Therefore, the nut 41 can support the fourth socket member 40, the support arm 15 and the mounting member 33 on the hook 6 of the second base member 5 through the bolt 38 and the spring 9.

A first unit of the rear view mirror assembly of the fourth embodiment includes the second base member 5, the spring 9, the fourth socket member 40, the support arm 15, the mounting member 33 and the bolt 38. The first unit of the fourth embodiment united by the bolt 38, so that it is easy for a worker to install the first unit of the fourth embodiment on the first base member 3. Accordingly it is not necessary for a worker to install components of the rear view mirror assembly on the windshield 1 piece by piece.

As described herein, the present invention overcomes the shortcomings of the known art by providing a first unit of the rear view mirror assembly enables a worker to install easily components of the rear view mirror assembly on a windshield or a body member of a vehicle.

While the present invention has been described in its preferred embodiments, it is to be understood that the invention is not limited thereto, and may be otherwise embodied within the scope of the following claims.

What is claimed is:

1. A rear view mirror assembly of a vehicle comprising:
   a first base member secured to the vehicle, the first base member having a side portion with a first flange and a front portion with a second flange; and
   a unit of the rear view mirror assembly comprising,
      a second base member mounted on the first and second flanges of said first base member, the second base member having a hook and a mounting portion thereon,
      a spring member mounted on the hook of said second base member and having an engagement means thereon, the spring member supporting a predetermined amount of a force on the hook of said second base member,
      a mounting member having a first surface disposed on the mounting portion of said second base member, the mounting member having a first aperture and a first socket portion disposed around the first aperture on a second opposite surface of said mounting member,
      a support arm having a first end with an outer surface, an inner surface and an inner peripheral edge, and a second opposite end rotatably supporting a rear view mirror,
      the outer surface of said support arm mounted slidably on the first socket portion of said mounting member,
      the inner surface of said support arm having a second socket portion,
      the inner peripheral edge defining a second aperture extending from the second socket portion of the inner surface to the outer surface of said support arm, a diameter of the second aperture of said support arm being greater than a diameter of the first aperture of said mounting member, a second ball member mounted slidably on the second socket portion of the inner surface of said support arm, and an engagement member inserted into the second aperture of said support arm and the first aperture of said mounting member, the engagement member having one end engaging with the engagement device of said spring member, and an opposite end of the engagement member connected to said second ball member, the engagement member supporting said second ball member, said support arm and said mounting member on said second base member through said spring member, said unit of the rear view mirror assembly being united by said engagement member, and installed on said first base member.

2. The rear view mirror assembly as set forth in claim 1, wherein the second flange of said first base member has a pawl, and said second base member of said unit has an engagement recess in which the pawl of the second flange of said first base member is inserted, the pawl of the second flange of said first base member preventing said second base member from separating from the second flange of said first base member.

3. The rear view mirror assembly as set forth in claim 2, wherein the first flange of said first base member has a plate which extends to the inside of said first base member, and said second base member of said unit has a gash which is defined within a side surface of said second base member, whereby the plate of said first base member is inserted into the gash of said second base member.

4. The rear view mirror assembly as set forth in claim 3, wherein the gash of said second base member has an inclined inner surface, whereby the plate of said first base member is bent along the inclined inner surface of said second base member.

5. The rear view mirror assembly as set forth in claim 3, wherein the plate of the first flange of said first base member has a protrusion thereon, and said second base member has an inner surface which is disposed within the gash thereof, whereby the protrusion of the plate of the first flange contacts the inner surface of said second base member.

6. The rear view mirror assembly as set forth in claim 5, wherein the protrusion of the plate of the first flange of said first base member is biased toward the inner surface of said second base member.

7. The rear view mirror assembly as set forth in claim 3, wherein the plate of the first flange of said first base member has a first stopper on a front end thereof, whereby the first stopper of the plate of the first flange prevents said second base member from being inserted more than a predetermined distance on the first flange of said first base member.

8. The rear view mirror assembly as set forth in claim 7, wherein the first stopper is biased toward the rear direction of the said first base member.

9. The rear view mirror assembly as set forth in claim 2, wherein the second flange of said first base member has a second stopper, whereby the second stopper of the second flange of said first base member prevents said second base member from being inserted more than a predetermined distance on the second flange of the first base member.

10. The rear view mirror assembly as set forth in claim 2, wherein the first flange of said first base member has a plate which extends to the inside of said first base member, and said second base member of said unit has a projection which is disposed on a side surface of said second base member, whereby the projection of said second base member is mounted on the plate of said first base member.

11. A rear view mirror assembly for installation on the body member of a vehicle comprising:

a first base member having a wall, a first flange and clamping tabs, the wall of the first base member extending from a main plate of the first base member, the first flange of the first base member extending inwardly from a lower edge of the wall of the first base member, the clamping tabs extending in a rearward direction of said vehicle from both ends of the wall of the first base member; and a first unit of the rear view mirror assembly comprising, a second base member having a mount portion, a first plate and a hook thereon, a front part of the mount portion of the second base member being mounted on the first flange of said first base member, the first plate being mounted on the clamping tabs of said first base member, a spring member mounted on the hook of said second base member, the spring member having a cap and supporting a predetermined amount of a force on the hook of said second base member, a mounting member disposed on an inner part of the mounting portion of said second base member, the mounting member having a first aperture and a first socket portion, the first aperture opened in the first socket portion and disposed on a surface of the mounting member, a support arm having a first end with a first ball portion, an inner peripheral edge and a second socket portion, and a second opposite end which rotatably supports a rear view mirror, the first ball portion of said support arm disposed on an outer surface of the first end of said support arm, the first ball portion mounted slidably on the first socket portion of said mounting member, the second socket portion disposed on an inner surface of the first end of said support arm, the inner peripheral edge defining a second aperture within the first end of said support arm, the second aperture extending through the second socket portion of said support arm and the first ball portion of said support arm, a diameter of the second aperture being greater than a diameter of the first aperture of said mounting member, a second ball member mounted slidably on the second socket portion of said support arm, the second ball member having a third aperture thereon, and an engagement member inserted into the third aperture of said second ball member, the second aperture of said support arm and the first aperture of said mounting member, one end of the engagement member engaging with the cap of said spring member, an opposite end of the engagement member having a head portion which supports said second ball member, said support arm and said mounting member on said second base member through said spring member, said unit of the rear view mirror assembly being united by said engagement member, and said unit of the rear view mirror assembly being installed on said first base member.

12. The rear view mirror assembly as set forth in claim 11, wherein the wall of said first base member is formed in a 'U' shape.

13. The rear view mirror assembly as set forth in claim 12, wherein the wall of said first base member has a plurality of holes thereon, and an outer peripheral wall of said second base member has a corresponding plurality of pawls which engage with the plurality of holes of the wall of said first base member.

14. The rear view mirror assembly as set forth in claim 13, wherein the first plate of said second base member includes a step which is defined within a rear part of said second base member, and the first plate is disposed within a space which is defined between the clamping tabs of said first base member and the main plate of said first base member.

15. The rear view mirror assembly as set forth in claim 14, wherein the clamping tab of said first base member is biased inwardly and into contact with a surface formed in the step of said second base member.

16. The rear view mirror assembly for a vehicle comprising:
a first base member cemented to a body member of the vehicle, the first base member having a side portion with a first flange and a front portion with a second flange; and
a unit of the rear view mirror assembly comprising,
a second base member mounted on the first flange and the second flange of said first base member, the second base member having a hook and a mounting portion thereon,
a spring member mounted on the hook of said second base member and having a first engagement device thereon, the spring member being able to support a predetermined amount of a downward vertical force on the hook of said second base member;
a mounting member disposed on the mounting portion of said second base member, the mounting member having a first aperture and a first ball portion, the first ball portion disposed around the first aperture thereof, the first ball portion disposed on a bottom surface of the mounting member,
a support arm having an outer surface, an inner surface and an inner peripheral edge disposed on an end thereof,
the outer surface of said support arm mounted slidably on the first ball portion of said mounting member,
the inner surface of said support arm having a second ball portion,
the inner peripheral edge defining a second aperture within the end of said support arm, the second aperture of said support arm extending from the second ball portion of the inner surface to the outer surface of said support arm, a diameter of the second aperture being greater than the diameter of the first aperture of said mounting member,
a rear view mirror mounted rotatably on an opposite end of said support arm,
a first socket member mounted slidably on the second ball portion of said support arm, and
an engagement member inserted into the second aperture of said support arm and the first aperture of said mounting member, the engagement member having one end engaging with the first engagement device of said spring member, and an opposite end of engagement member connected to said first socket member, the engagement member supporting said first socket member, said support arm and said mounting member on said second base member through said spring member,
said unit of the rear view mirror assembly being united by said engagement member, and installed on said first base member.

17. The rear view mirror assembly as set forth in claim 16, wherein the second flange of said first base member has a pawl, and said second base member of said unit has a recess in which the pawl of the second flange of said first base member is inserted, the pawl of the second flange of said first base member preventing said second base member from moving on the second flange of said first base member.

18. The rear view mirror assembly as set for the in claim 17, wherein the first flange of said first base member has a plate which extends to the inside of said first base member, and said second base member of said unit has a projection which is disposed on a side surface of said second base member, whereby the projection of said second base member is mounted on the plate of said first base member.

19. The rear view mirror assembly as set forth in claim 18, wherein the plate of the first flange of said first base member has a protrusion thereon, and said projection of said second base member has a lower surface, whereby the protrusion of the plate of the first flange is in contact with the lower surface of the projection of said second base member.

20. The rear view mirror assembly as set forth in claim 19, wherein the protrusion of the plate of the first flange of said first base member is biased toward the lower surface of the projection of said second base member.

* * * * *